(12) United States Patent
Oohinata (10) Patent No.: US 10,989,303 B2
(45) Date of Patent: Apr. 27, 2021

(54) CYLINDER HEAD GASKET AND STAINLESS STEEL SHEET FOR CYLINDER HEAD GASKET

(71) Applicant: NICHIAS CORPORATION, Tokyo (JP)

(72) Inventor: Tetsuo Oohinata, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 147 days.

(21) Appl. No.: 16/066,542

(22) PCT Filed: Dec. 22, 2016

(86) PCT No.: PCT/JP2016/088368
§ 371 (c)(1),
(2) Date: Jun. 27, 2018

(87) PCT Pub. No.: WO2017/115717
PCT Pub. Date: Jul. 6, 2017

(65) Prior Publication Data
US 2019/0003594 A1 Jan. 3, 2019

(30) Foreign Application Priority Data
Dec. 28, 2015 (JP) .............................. JP2015-256259

(51) Int. Cl.
*F16J 15/08* (2006.01)
*C22C 38/38* (2006.01)
(Continued)

(52) U.S. Cl.
CPC ........... *F16J 15/0825* (2013.01); *C22C 38/18* (2013.01); *C22C 38/38* (2013.01); *F16J 15/0806* (2013.01);
(Continued)

(58) Field of Classification Search
CPC ................. F16J 15/0806; F16J 15/0825; F16J 2015/0856; F16J 2015/0868; C22C 38/38
See application file for complete search history.

(56) References Cited

U.S. PATENT DOCUMENTS 5,277,434 A * 1/1994 Kestly ................. F16J 15/0825
277/592
5,431,418 A * 7/1995 Hagiwara ............ F16J 15/0825
277/592
(Continued)

FOREIGN PATENT DOCUMENTS

CN 101270455 A 9/2008
EP 0994199 A1 4/2000
(Continued)

OTHER PUBLICATIONS

Penn Stainless Steel Products, "420 Stainless Steel", Feb. 2015, http://www.pennstainless.com/stainless-grades/400-series-stainless/420-stainless-steel/, archived version retrieved https://web.archive.org/web/20150208124348/http://www.pennstainless.com/stainless-grades/400-series-stainless/420-stainles (Year: 2015).*
(Continued)

*Primary Examiner* — Nicholas L Foster
(74) *Attorney, Agent, or Firm* — Westerman, Hattori, Daniels & Adrian, LLP (57) ABSTRACT

A cylinder head gasket includes a composite member formed of a metal substrate and a rubber layer provided to both surfaces of the substrate. The substrate is formed of stainless steel having a content of C that is 0 to 0.15 mass %, a content of Si that is 0 to 0.5 mass %, a content of Mn that is 0 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance
(Continued)

Fe, and inevitable impurities. The stainless steel forming the substrate has a 0.2% proof stress of 1,300 to 1,500 MPa.

4 Claims, 4 Drawing Sheets

(51) Int. Cl.
   *C22C 38/18* (2006.01)
   *C22C 38/00* (2006.01)
   *F02F 11/00* (2006.01)
(52) U.S. Cl.
   CPC ......... *F16J 15/0818* (2013.01); *C22C 38/004* (2013.01); *F02F 11/002* (2013.01); *F16J 2015/085* (2013.01)

(56) References Cited

U.S. PATENT DOCUMENTS

| | | | | |
|---|---|---|---|---|
| 5,490,681 | A * | 2/1996 | Plunkett | F16J 15/0825 277/592 |
| 5,588,657 | A | 12/1996 | Fujisawa et al. | |
| 6,488,786 | B2 * | 12/2002 | Hiramatsu | C21D 6/004 148/325 |
| 6,749,701 | B2 * | 6/2004 | Hiramatsu | C21D 6/004 148/610 |
| 6,921,084 | B2 * | 7/2005 | Mickelson | F02F 11/002 277/591 |
| 7,727,341 | B2 * | 6/2010 | Popielas | C22C 19/03 148/320 |
| 9,631,249 | B2 * | 4/2017 | Adachi | C21D 6/002 |
| 2001/0017173 | A1 * | 8/2001 | Hiramatsu | C21D 6/004 148/325 |
| 2003/0131910 | A1 * | 7/2003 | Hiramatsu | C21D 6/004 148/320 |
| 2003/0173747 | A1 * | 9/2003 | Mickelson | F02F 11/002 277/601 |
| 2005/0057004 | A1 | 3/2005 | Yamazaki et al. | |
| 2006/0191603 | A1 * | 8/2006 | Popielas | C22C 19/03 148/320 |
| 2009/0200753 | A1 * | 8/2009 | Popielas | C22C 19/03 277/593 |
| 2011/0024991 | A1 | 2/2011 | Capellmann et al. | |
| 2014/0299239 | A1 * | 10/2014 | Adachi | C21D 6/002 148/609 |
| 2019/0119775 | A1 * | 4/2019 | Nakamura | C21D 9/46 |
| 2019/0264298 | A1 * | 8/2019 | Nakamura | C22C 38/00 |

FOREIGN PATENT DOCUMENTS

| | | |
|---|---|---|
| EP | 1582782 A1 | 10/2005 |
| JP | H05-271878 A | 10/1993 |
| JP | H05-086070 U | 11/1993 |
| JP | H06-032836 U | 4/1994 |
| JP | H06-228641 A | 8/1994 |
| JP | H07-243530 A | 9/1995 |
| JP | H07-278758 A | 10/1995 |
| JP | 2000-129401 A | 5/2000 |
| JP | 2000-256802 A | 9/2000 |
| JP | 2001-271140 A | 10/2001 |
| JP | 2003-105502 A | 4/2003 |
| JP | 2004-99990 A | 4/2004 |
| JP | 2014-59062 A | 4/2014 |

OTHER PUBLICATIONS

"420 Stainless Steel", MatWeb NPL, Sep. 17, 2008, available http://www.matweb.com/search/datasheet.aspx?MatGUID=641544e4c9f1425390d05ae37d55440a, retrieved Sep. 24, 2020 (Year: 2008).*
Matweb NPL 2, "Ametek P409L P/M Stainless Steel, Sintered from 6.00 g/cc Green Density", available http://www.matweb.com/search/datasheet.aspx?MatGUID=8bd94d53582f41009e6fa8c4aa61ad7a&ckck=1, retrieved Dec. 19, 2020.*
Office Action dated Jul. 18, 2019, issued in counterpart CN application No. 201680076998.0, with English translation. (12 pages).
Extended (supplementary) European Search Report dated Jul. 11, 2019, issued in counterpart EP Application No. 16881692.4. (14 pages).
Partial (supplementary) European Search Report dated May 22, 2019, issued in counterpart EP Application No. 16881692.4. (14 pages).
Li, Yuanli "New Edition Handbook for Quick Check of Performance Application by Steel Type" vol. 3, Jilin Publishing Group Co., Ltd., Jilin Electronic Publishing Group Co., Ltd., Jun. 2015, pp. 1232 to 1250; Cited in CN Office Action dated Feb. 25, 2020. (19 pages).
Office Action dated Feb. 25, 2020, issued in counterpart CN Application No. 201680076998.0, with English Translation. (23 pages).
Office Action dated Jun. 2, 2020, issued in counterpart CN Application No. 201680076998.0, with English translation (17 pages).
Office Action dated Oct. 5, 2020, issued in counterpart European Application No. 16881692.4 (in English; 4 pages).
International Search Report dated Apr. 4, 2017, issued in counterpart International Application No. PCT/JP2016/088368 (1 page).
Office Action dated Feb. 25, 2021, issued in counterpart European Patent Application No. 16881692.4 (in English; 5 pages).

* cited by examiner

FIG. 5 though the inventors do not clearly understand the reason, it is considered that when the content of nickel is 0 to 0.6 mass % and the 0.2% proof stress is in the range of 1,300 to 1,500 MPa, both of high durability of sealing performance and cost reduction of the gasket can be achieved in a good balance.

CYLINDER HEAD GASKET AND STAINLESS STEEL SHEET FOR CYLINDER HEAD GASKET

TECHNICAL FIELD

The present invention relates to a metal cylinder head gasket that is sandwiched between joining surfaces of a cylinder block and a cylinder head in an internal combustion engine, and seals between the cylinder block and the cylinder head, and a stainless steel sheet for the cylinder head gasket that is used as a substrate thereof.

BACKGROUND ART

Conventionally, there has been known a metal gasket that is sandwiched between joining surfaces of a cylinder block and a cylinder head and exhibits sealing properties, in other words, a cylinder head gasket.

This kind of cylinder head gasket includes a seal unit formed in a shape of a joining surface, and has a bead formed on the seal unit. In the cylinder head gasket, when the seal unit of the cylinder head gasket is strongly sandwiched between a cylinder block and a cylinder head by being fastened with bolts, surface pressure concentrates on the bead of the cylinder head gasket, so that the seal unit of the gasket closely adheres to two surfaces of a joining part, thereby enhancing airtightness.

In addition, a rubber layer is formed on a surface of the cylinder head gasket. This rubber layer absorbs surface roughness of joining surfaces of a cylinder block and a cylinder head, and ensures sealing properties.

Steel use stainless (SUS) 301H material is generally used for a substrate of the current cylinder head gasket, but cost reduction of the gasket has been required in recent years. As one of the means, there is cost reduction due to a change in the kind of a substrate.

SUS 403 stainless steel does not include Ni that causes an increase in price, and may cause cost to be reduced. SUS 403 stainless steel also has an advantage of being unaffected by price fluctuation of Ni. Nickel-free stainless steel such as SUS 403 stainless steel or low-nickel stainless steel having a low content of Ni is listed as material for cost reduction.

SUMMARY OF INVENTION

Problem to be Solved by the Invention

However, when considering use of nickel-free stainless steel such as SUS 403 or low-nickel stainless steel as material for a base material of a cylinder head gasket, the inventors found that durability of sealing performance is low.

An object of the present invention is therefore to provide a cylinder head gasket having high durability of sealing performance even when nickel-free or low-nickel stainless steel is used as material for a base material.

Means for Solving Problem

In such a situation, after conducting intensive studies, the inventors define, when a content of nickel is reduced or nickel is not included, a 0.2% proof stress value of stainless steel as a specific range so that a bead hardly fatigues in a durability test. Thus, the inventors find a way of obtaining a cylinder head gasket having high durability of sealing performance even when nickel-free or low-nickel stainless steel is used as a base material so as to complete the present invention.

In other words, the present invention (1) provides a cylinder head gasket that is sandwiched between joining surfaces of a cylinder head and a cylinder block and seals a joining part between the cylinder head and the cylinder block.

The cylinder head gasket includes a composite member that is formed of a metal substrate and a rubber layer provided to both surfaces or one surface of the substrate.

The substrate is formed of stainless steel having a content of C that is 0 to 0.15 mass %, a content of Si that is 0 to 0.5 mass %, a content of Mn that is 0 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance Fe, and inevitable impurities.

The stainless steel forming the substrate has a 0.2% proof stress of 1,300 to 1,500 MPa.

The present invention (2) provides a stainless steel sheet for a cylinder head gasket that is formed of stainless steel having a content of C that is 0 to 0.15 mass %, a content of Si that is 0 to 0.5 mass %, a content of Mn that is 0 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance Fe, and inevitable impurities, and having a 0.2% proof stress of 1,300 to 1,500 MPa.

Effect of the Invention

The present invention can provide a cylinder head gasket using nickel-free or low-nickel stainless steel as material for a base material and having high durability of sealing performance.

DESCRIPTION OF EMBODIMENTS

Figure 1:
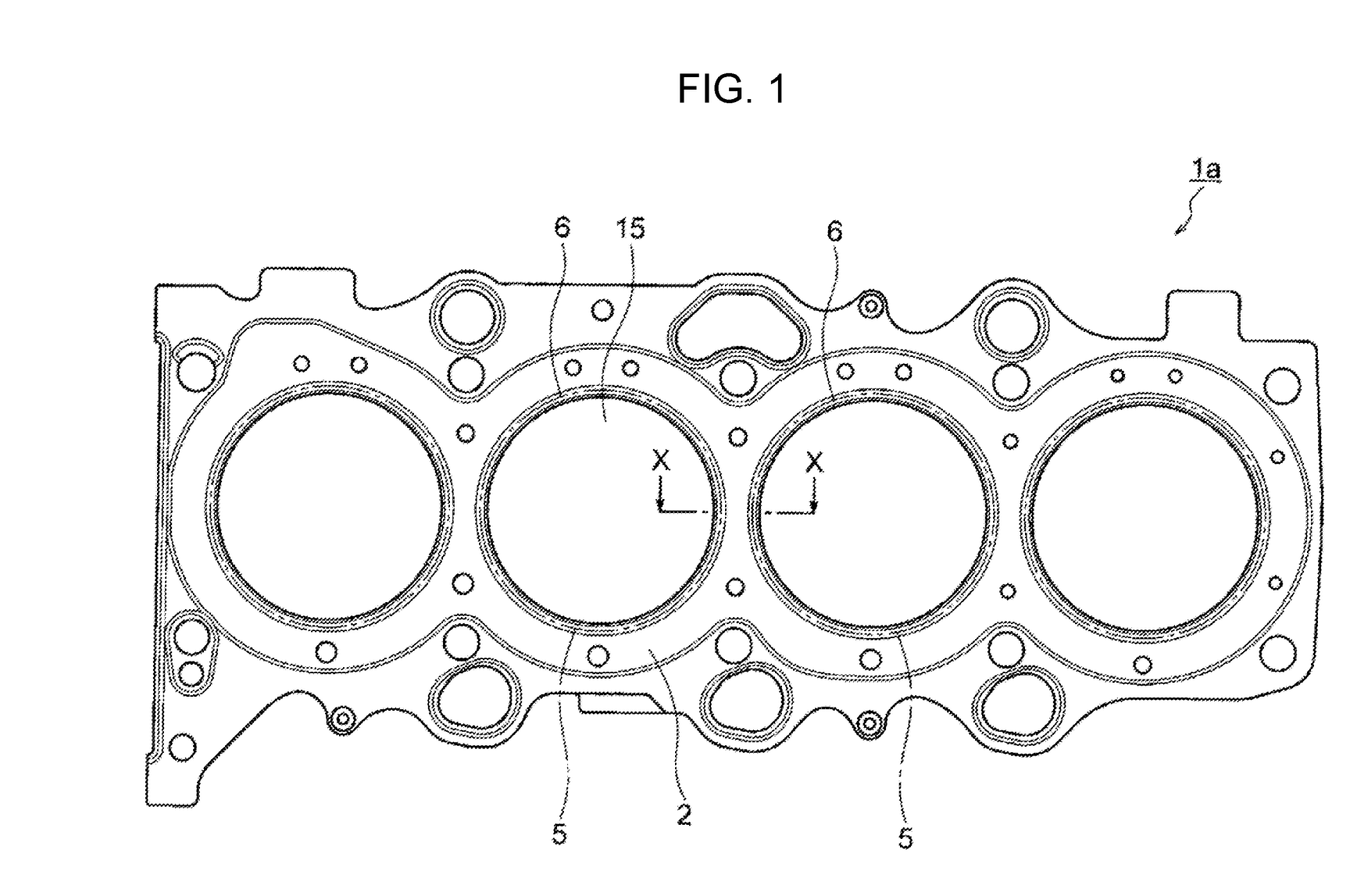
FIG. 1 is a schematic plan view illustrating a cylinder head gasket according to an embodiment example of the present invention.
Figure 2:
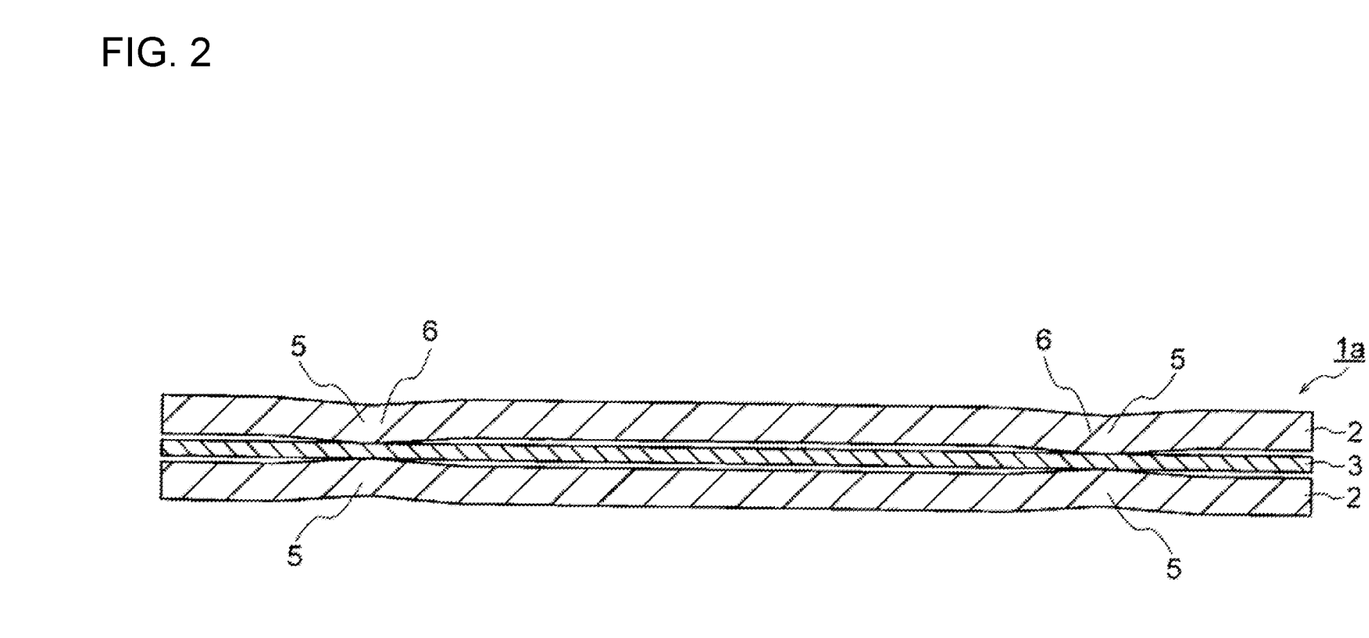
FIG. 2 is an end surface view along line X-X in FIG. 1.
Figure 3:
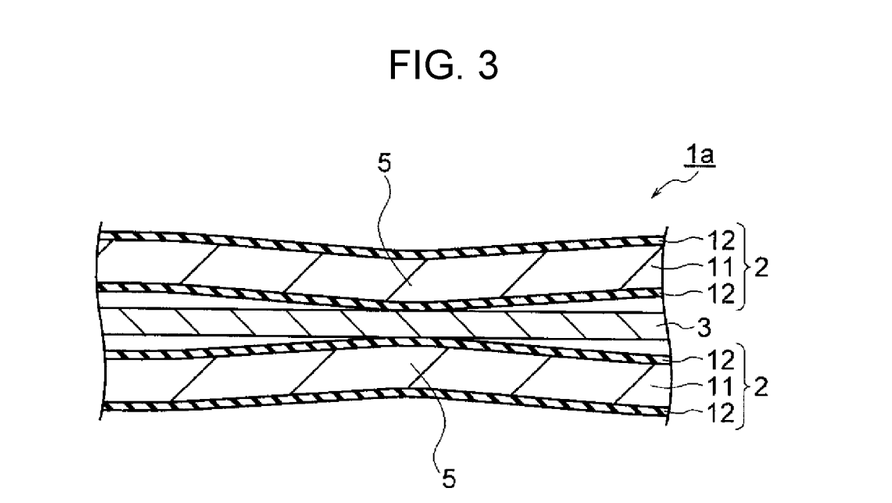
FIG. 3 is an enlarged view illustrating the immediate vicinity of a bead in FIG. 2.

The shape of a cylinder head gasket according to the present invention is described with reference to FIGS. 1 to 3. FIG. 1 is a schematic plan view illustrating a cylinder head gasket according to an embodiment example of the present invention. FIG. 2 is an end surface view along line X-X in FIG. 1. FIG. 3 is an enlarged view illustrating the immediate vicinity of a bead in FIG. 2.

As illustrated in FIG. 1, a cylinder head gasket 1a includes an aperture 15 having a diameter slightly greater than a bore diameter of a cylinder bore, and the other parts having the shape corresponding to joining surfaces of a cylinder head and a cylinder block. In order to seal the inside and outside of the aperture 15, the cylinder head gasket 1a is provided with a round sealing unit 6 for surrounding the aperture 15.

As illustrated in FIG. 2, the structure of the sealing unit 6 in the cylinder head gasket 1a illustrated in FIG. 1 is a three-layered structure that is formed of one sheet metal 3 and two composite members 2 disposed on both surface sides of the sheet metal 3. The composite members 2 of the sealing unit 6 have a bead 5 formed thereon. In FIG. 1, the center line of the bead 5 is indicated by a dot-and-dash line.

As illustrated in FIG. 3, each of the composite members 2 includes a stainless steel substrate 11 and rubber layers 12 provided to both surfaces of the substrate 11.

The cylinder head gasket 1a is disposed between joining surfaces of a cylinder head and a cylinder block. When the cylinder head gasket 1a is strongly sandwiched between the joining surfaces by the cylinder head and the cylinder block being fastened, surface pressure concentrates on the bead 5 of the sealing unit 6, so that the sealing unit 6 of the cylinder head gasket 1a closely adheres to the joining surfaces of the cylinder head and the cylinder block. The rubber layers 12 are provided to both surfaces of the composite members 2 on which the bead 5 is formed, so that surface roughness of the cylinder head and the cylinder block is absorbed by the rubber layers 12, thereby enhancing airtightness.

The cylinder head gasket according to the present invention is sandwiched between joining surfaces of a cylinder head and a cylinder block, and seals a joining part between the cylinder head and the cylinder block.

The cylinder head gasket includes a composite member that is formed of a metal substrate and a rubber layer provided to both surfaces or one surface of the substrate.

The substrate is formed of stainless steel having a content of C that is 0 to 0.15 mass %, a content of Si that is 0 to 0.5 mass %, a content of Mn that is 0 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance Fe, and inevitable impurities.

The stainless steel forming the substrate has a 0.2% proof stress of 1,300 to 1,500 MPa.

The cylinder head gasket according to the present invention is disposed between joining surfaces of a cylinder head and a cylinder block. A cylinder head and a cylinder block are fastened with a bolt and the like to cause the cylinder head gasket to be sandwiched between the joining surfaces of the cylinder head and the cylinder block, specifically, the sealing unit of the gasket is sandwiched between the joining surfaces of the cylinder head and the cylinder block, thereby sealing a sealing surface of the cylinder head and the cylinder block.

The cylinder head gasket according to the present invention includes apertures for the cylinder bores each having a diameter slightly greater than a bore diameter of a cylinder bore by the number of the cylinder bores, and the other parts each having the shape corresponding to joining surfaces of a cylinder block and a cylinder head. In order to seal the inside and outside of the apertures for cylinder bores, the cylinder head according to the present invention is provided with sealing units for surrounding the apertures. The position at which the sealing units are formed is selected as appropriate based on the shape of a cylinder head and a cylinder block, an engine oil hole, a position of a cooling water flow path (water jaket area), and the like.

The cylinder head gasket according to the present invention includes a composite member that is formed of a stainless substrate and rubber layers provided to both surfaces of the substrate. In other words, the cylinder head gasket according to the present invention includes a composite member formed of a substrate that is a molded body of one stainless steel sheet and rubber layers provided to both surfaces of the substrate.

Figure 4:
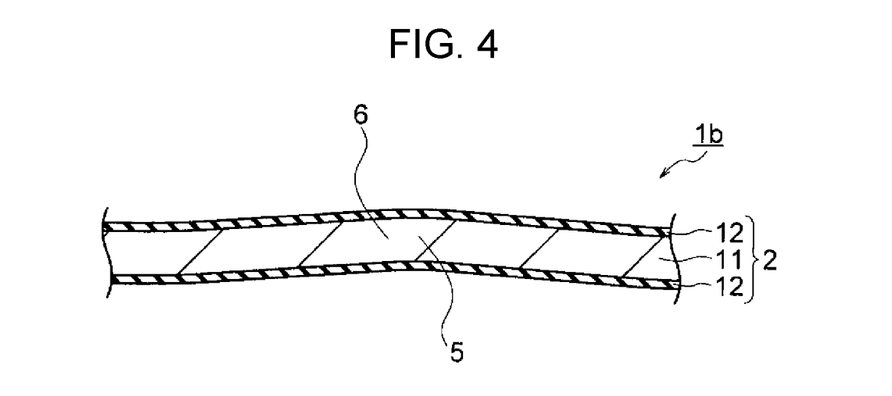
FIG. 4 is a schematic end surface view illustrating a cylinder head gasket according to an embodiment example of the present invention.

Examples of the cylinder head gasket according to the present invention include a cylinder head gasket in which a structure of a sealing unit of the cylinder head gasket is, for example, as the embodiment example illustrated in FIG. 3, a three-layered structure that is formed of one sheet metal and composite members disposed on both surface sides of the sheet metal, a cylinder head gasket in which a structure of a sealing unit of the cylinder head gasket is, as the embodiment example illustrated in FIG. 4, a single-layered structure that is formed of one composite member, and a cylinder head gasket in which a structure of a sealing unit of the cylinder head gasket is a laminated structure that is formed of a plurality of composite members and a plurality of sheet metals. The structure of the sealing unit of the cylinder head gasket according to the present invention is selected as appropriate. In the embodiment example illustrated in FIG. 4, the sealing unit 6 of a cylinder head gasket 1b is formed of one of the composite members 2 that is formed of the stainless substrate 11 and the rubber layers 12 provided to both surfaces of the substrate 11. The sealing unit 6 has the bead 5 formed thereon. FIG. 4 is a schematic end surface view illustrating a cylinder head gasket according to an embodiment example of the present invention, and is an enlarged view illustrating the immediate vicinity of the bead.

On the sealing unit of the composite members, there is formed a bead that projects from a surface of the substrate, for example, to a height of about 0.08 mm and goes along the sealing unit. The height of the bead is not particularly limited, and is selected as appropriate by the structure and rigidity of a cylinder head and a cylinder block and a usage environment such as fastening conditions and a head lift amount (opening amount). Because surface pressure concentrates on the bead when the seal unit is sandwiched between a cylinder block and a cylinder head, the bead is a part on which sealing properties are enhanced. Examples of the bead include a projecting bead and a wavelike bead. The bead may project on one of the surfaces of the substrate and may project on both surfaces of the substrate. The forming position, the shape, the number, and the like of the bead are selected as appropriate.

The substrate is formed of stainless steel having a content of C that is 0 to 0.15 mass %, a content of Si that is 0 to 0.5 mass %, a content of Mn that is 0 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance Fe, and inevitable impurities. In other words, the substrate is formed of low-nickel stainless steel or nickel-free stainless steel. Thus, the cylinder head gasket according to the present invention is low in cost. In the stainless steel forming the substrate, the content in any one of or two or more of C, Si, Mn, N, P, S, and Ni may be 0 mass %.

The stainless steel forming the substrate has a 0.2% proof stress of 1,300 to 1,500 MPa, preferably 1,300 to 1,400 MPa. When the 0.2% proof stress of the stainless steel forming the substrate is in the above range, explosive combustion of an engine bore causes joining surfaces of a cylinder block and a cylinder head to repeatedly move up and down. In this manner, the bead, even when cyclic loads are applied to the bead, hardly fatigues, and durability of sealing performance is enhanced. By contrast, when the 0.2% proof stress of the stainless steel forming the substrate is below the above range, the bead easily fatigues and durability of sealing performance becomes low. When the 0.2% proof stress is beyond the above range, flexibility of the stainless steel is lost, sheet is not straightened, and smoothness cannot be obtained unless the stainless steel is pulled with strong tension. If smoothness cannot be obtained, a rubber layer is unlikely to be uniformly coated, and the rubber layer becomes so hard that bead processing is unlikely to be performed and a targeted shape cannot be obtained.

Elongation of the stainless steel forming the substrate is preferably 2 to 10%, more preferably 2 to 6%. When the elongation of the stainless steel forming the substrate is in the above range, the bead hardly fatigues and durability of sealing performance is enhanced. Tensile strength of the stainless steel forming the substrate is preferably 1,400 to 1,600 MPa, more preferably 1,500 to 1,600 MPa. When the tensile strength of the stainless steel forming the substrate is in the above range, the bead hardly fatigues and durability of sealing performance is enhanced.

In a production process where a stainless alloy ingot having a prescribed composition described above is cast and various kinds of processing and heat treatment are applied to the obtained ingot so as to process a steel sheet, the stainless steel sheet forming the substrate is produced, for example, by selecting the compounding ratio of each chemical component and adjusting an alloy composition, selecting working strength in cold working and conditions of heat treatment performed in the middle of the process, and the like so as to adjust the 0.2% proof stress of the stainless steel sheet forming the substrate to 1,300 to 1,500 MPa, more preferably 1,300 to 1,400 MPa, if necessary, to preferably adjust the elongation of the stainless steel forming the substrate to 2 to 10%, more preferably 2 to 6%, and to preferably adjust tensile strength of the stainless steel forming the substrate to 1,400 to 1,600 MPa, more preferably 1,500 to 1,600 MPa.

The composite member has the rubber layer provided on both surfaces or one surface of the substrate. The rubber layer provided to the substrate is not particularly limited, and may be any rubber layer used as a rubber layer for a cylinder head gasket. Examples of the rubber layer include acrylonitrile-butadiene rubber (NBR), hydrogenated acrylonitrile-butadiene rubber (H-NBR) or functional group-modified acrylonitrile-butadiene rubber (hereinafter, simply referred to as "NBR"), fluorine-contained rubber, silicon rubber, acrylic butadiene rubber, and ethylene-propylene-diene rubber (EPDM).

Examples of a method for providing a rubber layer on a surface of the stainless steel sheet forming the substrate include a method in which a rubber solution causing a rubber material to be dissolved in a suitable solvent or a rubber dispersion dispersing a rubber material into a suitable solvent is applied to a surface of the stainless steel sheet with a schema coater, a roll coater, and the like, and a coated film is heated at 150 to 250° C. so as to form the rubber layer. The rubber layer is preferably formed on both sides of a substrate in terms of enhancing sealing properties. In producing the cylinder head gasket according to the present invention, a rubber layer may be provided to a flat stainless steel sheet first, and after that, the stainless steel sheet may be punched into a predetermined shape so as to form a shape of a gasket, or a stainless steel sheet may be punched into a predetermined shape, and after that, a rubber layer may be provided to the stainless steel sheet.

Thickness of the rubber layer provided to a surface of a base material is not particularly limited, but the thickness is usually 0.025 to 0.1 mm, preferably 0.025 to 0.05 mm.

The composite member can include, besides the substrate and the rubber layer, a surface processing layer for preventing fixing of gasket products, reducing a friction coefficient, improving abrasion resistance, and the like, if necessary. The surface processing layer formed on a surface of the substrate is, if the surface processing layer can achieve the purpose described above, not particularly limited, and is selected as appropriate. The composite member can include, besides the substrate and the rubber layer, a primer layer formed of, for example, a polybutadiene type such as polybutadiene, hydrogenated type polybutadiene, and modified polybutadiene, and a novolac-type or resol-type phenolic resin for improving adhesion of the rubber layer to the substrate, if necessary.

As the embodiment example illustrated in FIG. 4, when the cylinder head gasket according to the present invention has the structure of the sealing unit that is formed of a composite member and a sheet metal, material of the sheet metal is not particularly limited. Examples of the material of the sheet metal include stainless steel such as SUS 304 and SUS 301, and stainless steel the same as that of the substrate of the composite member, and the material of the sheet metal is selected as appropriate.

The stainless steel sheet for the cylinder head gasket according to the present invention is formed of stainless steel having a content of C that is 0 to 0.15 mass %, a content of Si that is 0 to 0.5 mass %, a content of Mn that is 0 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance Fe, and inevitable impurities.

The stainless steel sheet for the cylinder head gasket has a 0.2% proof stress of 1,300 to 1,500 MPa.

The stainless steel sheet for the cylinder head gasket according to the present invention is used as material for the substrate of the cylinder head gasket according to the present invention. For example, by forming the stainless steel sheet for the cylinder head gasket according to the present invention into a shape of the substrate of a predetermined cylinder head gasket, and after that, forming the rubber layer at a predetermined position, and by forming the rubber layer on both surfaces or one surface of the stainless steel sheet for the cylinder head gasket according to the present invention, and after that, forming the stainless steel sheet into a shape of the substrate of a predetermined cylinder head gasket, the cylinder head gasket according to the present invention can be produced.

A chemical composition (C, Si, Mn, Cr, N, P, S, and Ni) and physical properties (0.2% proof stress, elongation, and tensile strength) of stainless steel according to the stainless steel sheet for the cylinder head gasket of the present invention are the same as a chemical composition (C, Si, Mn, Cr, N, P, S, and Ni) and physical properties (0.2% proof stress, elongation, and tensile strength) of stainless steel according to the cylinder head gasket of the present invention.

The present invention is more specifically described with reference to an embodiment, but the embodiment is simply illustrated by an example and is not intended to limit the present invention.

Embodiment

First Embodiment

There was prepared a stainless steel sheet (thickness 0.2 mm) having a chemical composition and physical properties illustrated in Table 1. Subsequently, a sample for testing physical properties was punched out from the obtained stainless steel sheet so as to obtain the sample for testing physical properties, and the 0.2% proof stress, the elongation, and the tensile strength were measured. Table 1 shows the result.

Figure 5:
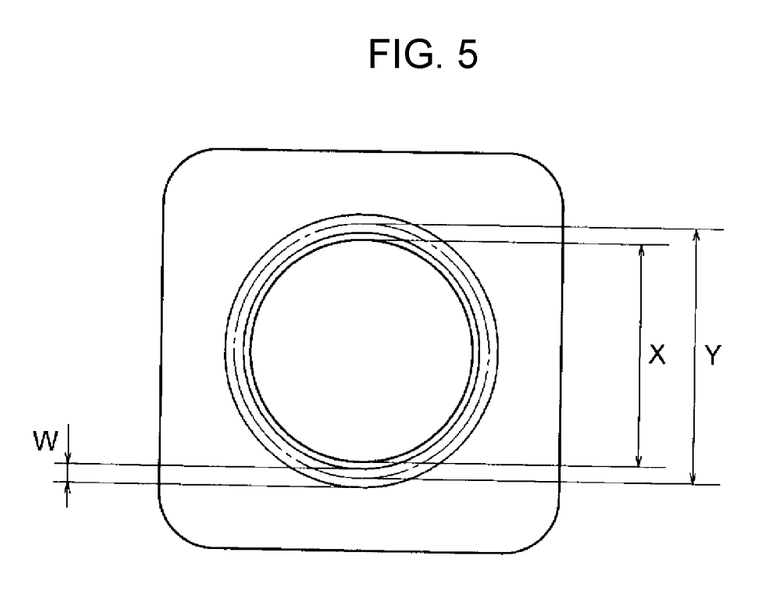
FIG. 5 is a view illustrating the shape of a sample for evaluating a gasket according to the embodiments and comparison examples.

Subsequently, in the obtained stainless steel sheet, a square was made to be 99 mm square, the inside was punched into a circle having an internal diameter (x) of 64.85 mm, and a full bead having a mid-diameter (y) of 69.25 mm, a bead height of 0.08 mm, and a bead width (w) of 3 mm was annularly formed so as to obtain a sample for evaluating a gasket having a shape illustrated in FIG. 5.

Subsequently, a cyclic fatigue test was conducted with the following conditions, and a remaining bead height was measured. Table 1 shows the result.

<Physical Property Test>

In conformity to Japanese Industrial Standards (JIS) Z 2241, the 0.2% proof stress, the elongation, and the tensile strength are measured. In conformity to JIS Z 2244, the hardness is also measured.

bead becomes 0 mm. As a remaining bead height is higher, fatigue of the bead due to cyclic loads is considered to be smaller.

First Comparison Example

Similarly to the first embodiment, the measurement was made except that there was prepared a stainless steel sheet having a chemical composition and physical properties illustrated in the field of a first comparison example in Table 1. Table 1 shows the result.

Reference Example

Similarly to the first embodiment, the measurement was made except that here was prepared a stainless steel sheet having a chemical composition and physical properties illustrated in the field of a first reference example in Table 1. Table 1 shows the result. A chemical composition of the stainless steel in the first reference example corresponds to that of SUS 301.

TABLE 1

|  | First embodiment | Second embodiment | First comparison example | Second comparison example | Third comparison example | Fourth comparison example | Fifth comparison example | First reference example |
|---|---|---|---|---|---|---|---|---|
| Stainless steel sheet (mass %) | | | | | | | | |
| C | 0.13 | 0.13 | 0.13 | 0.13 | 0.13 | 0.13 | 0.13 | 0.11 |
| Si | 0.31 | 0.31 | 0.31 | 0.31 | 0.31 | 0.31 | 0.31 | 0.51 |
| Mn | 1.47 | 1.47 | 1.47 | 1.47 | 1.47 | 1.47 | 1.47 | 1.09 |
| Cr | 12.32 | 12.32 | 12.32 | 12.32 | 12.32 | 12.32 | 12.32 | 17.28 |
| N | 0 | 0 | 0 | 0 | 0 | 0 | 0 | 0 |
| P | 0.022 | 0.022 | 0.022 | 0.022 | 0.022 | 0.022 | 0.022 | 0.033 |
| S | 0 | 0 | 0 | 0 | 0 | 0 | 0 | 0.001 |
| Ni | 0 | 0 | 0 | 0 | 0 | 0 | 0 | 7.36 |
| Fe | Balance | Balance | Balance | Balance | Balance | Balance | Balance | Balance |
| Physical properties | | | | | | | | |
| Hardness (HV) | 530 | 514 | 488 | 470 | 461 | 419 | 386 | 440 |
| 0.2% proof stress (MPa) | 1,404 | 1,387 | 1,277 | 1,247 | 1,244 | 1,196 | 1,042 | 1,369 |
| Elongation (%) | 6.0 | 6.0 | 6.0 | 6.0 | 6.0 | 4.0 | 5.0 | 2.7 |
| Tensile strength (MPa) | 1,584 | 1,554 | 1,472 | 1,413 | 1,378 | 1,318 | 1,167 | 1,461 |
| Cyclic fatigue test | | | | | | | | |
| Remaining bead height (mm) | 0.069 | 0.069 | 0.065 | 0.063 | 0.062 | 0.061 | 0.056 | 0.069 |

<Cyclic Fatigue Test>

The sample for evaluating a gasket was installed while sandwiched between compression surfaces (outer diameter 80 mm) of a cyclic fatigue test device. With a load of 80 kN, cyclic compression from entirely bending to 7 μm of the bead restoration was performed on the sample for evaluating a gasket $1\times10^6$ times at a frequency of 30 Hz (30 times per second). Subsequently, a bead height of the sample for evaluating a gasket after the cyclic fatigue test was measured, and the measured bead height was defined as a remaining bead height. The remaining bead height was measured at four places for each 90° C. from a center angle of the sample for evaluating a gasket illustrated in FIG. 4, these measured values were averaged, and the obtained average value was defined as a remaining bead height. "Performing compression until the bead is entirely bent" indicates that compression is performed until a height of the In the samples for evaluating a gasket according to the first and second embodiments, a remaining bead height is higher as compared with the samples for evaluating a gasket according to the first to five comparison examples. Thus, in the samples for evaluating a gasket according to the first and second embodiments, fatigue of the bead due to cyclic loads is small, and the degree of fatigue of the bead due to cyclic loads is the same as that of the first reference example. In the embodiments, the comparison examples, and the reference example, the rubber layer is not provided in order to easily measure a height of the bead in a rigorous manner. In the sample for evaluating a gasket, if the stainless steel serving as the substrate is the same, whether or not the rubber layer is provided, a remaining bead height, in other words, the degree of fatigue of the bead due to cyclic loads is similar. Thus, in the sample for evaluating a gasket where the rubber layer is formed in the first and second embodiments, fatigue of the bead due to cyclic loads is smaller as compared with the sample for evaluating a gasket where the rubber layer is formed in the first and fifth comparison examples, and the degree of fatigue of the bead is the same as that of the sample for evaluating a gasket where the rubber layer is formed in the first reference examples.

INDUSTRIAL APPLICABILITY

The present invention can provide a cylinder head gasket excellent in durability of sealing performance at low cost because fatigue of a bead at the time of receiving cyclic loads is small even when a nickel-free or a low-nickel stainless steel material is used as a substrate.

The invention claimed is:

1. A cylinder head gasket that is sandwiched between joining surfaces of a cylinder head and a cylinder block, and seals a joining part between the cylinder head and the cylinder block, the cylinder head gasket comprising:
   a composite member that is formed of a metal substrate and a rubber layer provided to at least one surface of the substrate, wherein
   the substrate is formed of stainless steel having a content of C that is 0 to 0.13 mass %, a content of Si that is 0 to 0.5 mass %, a content of Mn that is 1.47 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance Fe, and inevitable impurities, and
   the stainless steel forming the substrate has a 0.2% proof stress of 1,300 to 1,500 MPa,
   elongation at break of the stainless steel forming the substrate is 4 to 6% as measured in accordance with JIS Z 2241,
   the 0.2% proof stress and the elongation at break are measured at room temperature.

2. The cylinder head gasket according to claim 1, wherein a structure of a sealing unit of the cylinder head gasket is a single-layered structure that is formed of the composite member.

3. The cylinder head gasket according to claim 1, wherein a structure of a sealing unit of the cylinder head gasket is a three-layered structure that is formed of a sheet metal member and two of the composite members being disposed on both surface sides of the sheet metal member.

4. A stainless steel sheet for a cylinder head gasket comprising:
   stainless steel having a content of C that is 0 to 0.13 mass %, a content of Si that is 0 to 0.5 mass %, a content of Mn that is 1.47 to 2.0 mass %, a content of Cr that is 11.5 to 13.0 mass %, a content of N that is 0 to 0.5 mass %, a content of P that is 0 to 0.040 mass %, a content of S that is 0 to 0.030 mass %, a content of Ni that is 0 to 0.6 mass %, the balance Fe, and inevitable impurities, wherein
   the stainless steel has a 0.2% proof stress of 1,300 to 1,500 MPa, and
   elongation at break of the stainless steel is 4 to 6% as measured in accordance with JIS Z 2241,
   the 0.2% proof stress and the elongation at break are measured at room temperature.

* * * * *